(12) United States Patent
Maestro Garcia et al.

(10) Patent No.: US 11,475,257 B2
(45) Date of Patent: Oct. 18, 2022

(54) MAPPING BETWEEN COLOR SPACES

(71) Applicant: Hewlett-Packard Development Company, L.P., Spring, TX (US)

(72) Inventors: Javier Maestro Garcia, Sant Cugat del Valles (ES); Jan Morovic, London (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 59 days.

(21) Appl. No.: 16/979,048

(22) PCT Filed: Apr. 6, 2018

(86) PCT No.: PCT/US2018/026544
§ 371 (c)(1),
(2) Date: Sep. 8, 2020

(87) PCT Pub. No.: WO2019/194830
PCT Pub. Date: Oct. 10, 2019

(65) Prior Publication Data
US 2021/0056367 A1    Feb. 25, 2021

(51) Int. Cl.
*G06K 15/02*        (2006.01)
*G01J 3/46*         (2006.01)
(52) U.S. Cl.
CPC ......... *G06K 15/1868* (2013.01); *G01J 3/462* (2013.01); *G06K 15/1881* (2013.01)
(58) Field of Classification Search
CPC .. G06K 15/1868; G06K 15/1881; G01J 3/462
(Continued)

(56) References Cited

U.S. PATENT DOCUMENTS

| 6,072,901 A | 6/2000 | Balonon-Rosen et al. |
| 6,389,161 B1 | 5/2002 | Krabbenhoft |
| (Continued) | | |

FOREIGN PATENT DOCUMENTS

| CN | 106256120 | 12/2016 |
| CN | 106464776 | 2/2017 |
| (Continued) | | |

OTHER PUBLICATIONS

International Search Report and Written Opinion dated Dec. 13, 2018, PCT Patent Application No. PCT/US2018/026544, filed Apr. 6, 2018, Federal Institute of Industrial Property, Moscow, Russia, 7 pages.

*Primary Examiner* — Quang N Vo
(74) *Attorney, Agent, or Firm* — HP Inc. Patent Department

(57) ABSTRACT

Certain examples described herein relate to mapping between an input color space and an output color space. In some cases, data representing a set of candidate output color values in the output color space is obtained for a transition region between two input color values in the input color space. A sub-region of the transition region is defined, the sub-region being associated with a target colorimetry and a target value of a metric. An output color value is selected from the set of candidate output color values. The output value has an associated value of the metric and an associated colorimetry. The selecting is based on the associated colorimetry and the target colorimetry, and the value of the metric and the target value of the metric. In some cases, mapping data is generated by assigning the selected output color value to the sub-region.

15 Claims, 6 Drawing Sheets

(58) Field of Classification Search
USPC .............................. 358/3.06, 1.9, 1.15, 3.13
See application file for complete search history.

(56) References Cited

U.S. PATENT DOCUMENTS

| | | | |
|---|---|---|---|
| 6,930,691 | B2 | 8/2005 | Lebowsky et al. |
| 7,742,058 | B2 | 6/2010 | Mahy et al. |
| 9,591,187 | B2 | 3/2017 | Martinez de Salinas Vazquez et al. |
| 9,674,399 | B2 | 6/2017 | Mahy et al. |
| 2003/0038798 | A1 | 2/2003 | Besl et al. |
| 2003/0081060 | A1 | 5/2003 | Zeng et al. |
| 2008/0252657 | A1 | 10/2008 | Watanabe |
| 2009/0296108 | A1* | 12/2009 | Gil .................. H04N 1/603 358/1.9 |
| 2011/0249280 | A1 | 10/2011 | Ito |
| 2016/0080612 | A1* | 3/2016 | Martinez de Salinas Vazquez ..... H04N 1/6008 358/3.06 |
| 2017/0048420 | A1 | 2/2017 | Morovic et al. |
| 2017/0126931 | A1 | 5/2017 | Morovic et al. |
| 2017/0324884 | A1 | 11/2017 | Morovic et al. |

FOREIGN PATENT DOCUMENTS

| | | |
|---|---|---|
| CN | 106464777 | 2/2017 |
| EP | 0626781 | 11/1994 |
| EP | 2989783 | 3/2016 |
| WO | WO-2015161898 | 10/2015 |
| WO | WO-2017184151 | 10/2017 |

* cited by examiner

MAPPING BETWEEN COLOR SPACES

CLAIM FOR PRIORITY

The present application is a national stage filing under 35 U.S.C 371 of PCT application number PCT/US2018/026544, having an international filing date of Apr. 6, 2018, the disclosure of which is hereby incorporated by reference in its entirety.

BACKGROUND

A printing system may include different printing fluids, e.g., colorants. By overprinting images for each of the printing fluids, an image with a range of different colors can be printed. An example printing pipeline may be calibrated so that printed colors are similar to or match desired colors, such as those defined in a digital format. Printing instructions may be provided based on values in an input color space. Associations between input color values and values in a print color space can be indicated to aid in printing according to printing instructions.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
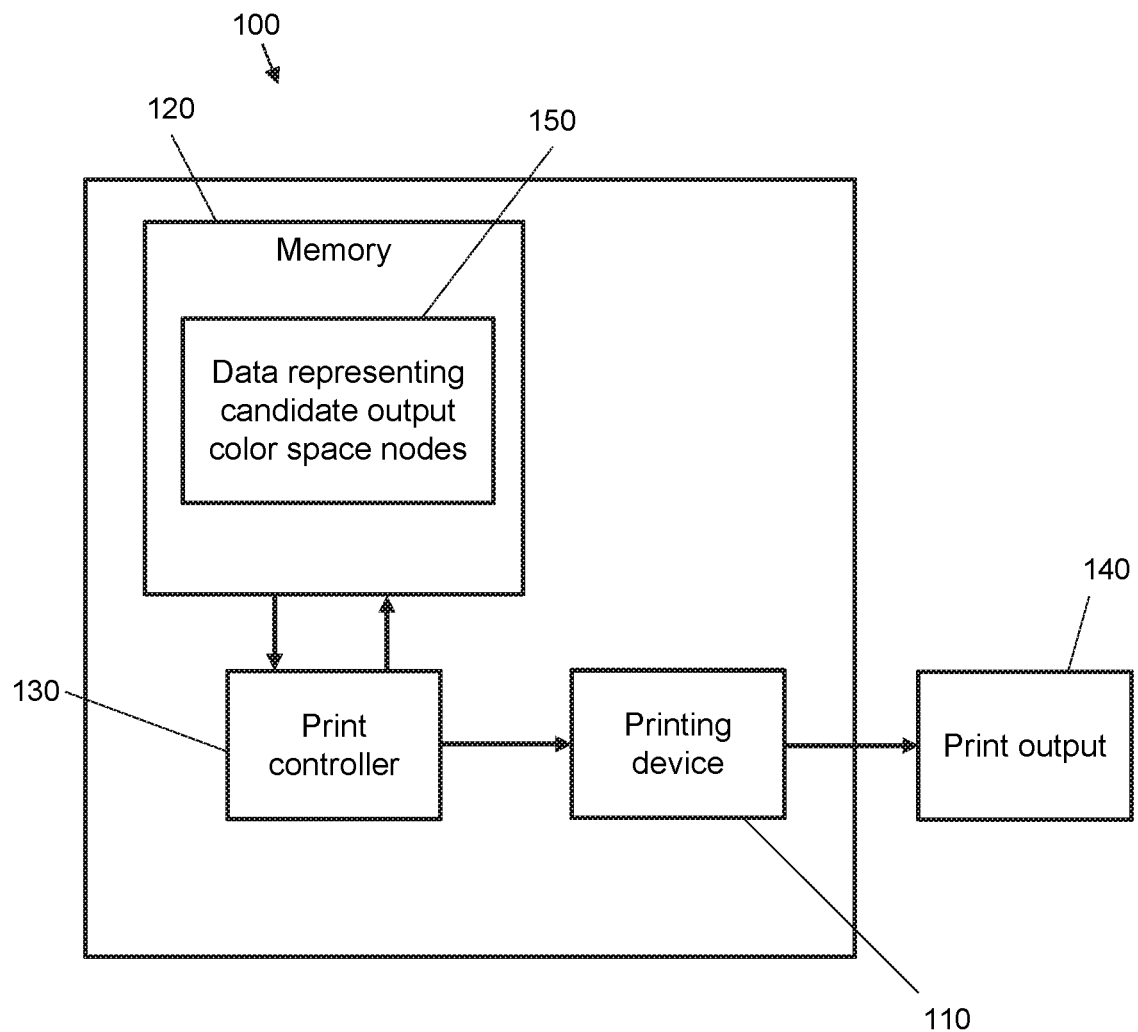
FIG. 1 is a schematic diagram of a printing system according to an example.

Color can be represented within imaging devices such as print and display devices in a variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables (X, Y and Z or tristimulus values) are used to model a color; the CIE 1976 (L*, a*, b*—CIELAB or 'LAB') color space, in which three variables represent lightness (L*) and opposing color dimensions (a* and b*); and the Yu'v' color space, in which three variables represent the luminance (Y) and two chrominance dimensions (u' and v').

Other color spaces include area coverage spaces, such as the Neugebauer Primary area coverage (NPac) color space. An NPac vector in the NPac color space represents a statistical distribution of Neugebauer Primaries (NPs) over an area of a halftone. In a simple binary (bi-level, i.e. two drop states: "drop" or "no drop") printer, an NP may be one of $2^k-1$ combinations of k printing fluids within the printing system, or an absence of printing fluid (resulting in $2^k$ NPs in total). An NP may thus be seen as a possible output state for a print-resolution area. The set of NPs may depend on an operating configuration of a device, such as a set of available colorants. A colorant or printing fluid combination as described herein may be formed of one or multiple colorants or printing fluids. For example, if a bi-level printing device uses CMY printing fluids there can be eight NPs or output states. These NPs relate to the following: C, M, Y, CM, CY, MY, CMY, and W (white or blank indicating an absence of printing fluid). An NP may comprise an overprint of two available printing fluids, such as a drop of magenta on a drop of cyan (for a bi-level printer) in a common addressable print area (e.g. a printable "pixel"). An NP may be referred to as a "pixel state".

In multi-level printers, e.g. where print heads are able to deposit N drop levels, an NP may include one of $N^k-1$ combinations of k printing fluids, or an absence of printing fluid (resulting in $N^k$ NPs in total). A multi-level printer may use a piezo-electric or thermal print head that is capable of depositing different numbers of drops or different drop volumes, and/or may use multiple passes of a print head, to enact different drop states. For example, if a multi-level printer uses CMY printing fluids with four different drop states ("no drop", "one drop", "two drops" or "three drops"), available NPs can include C, CM, CMM, CMMM, etc. A "drop sequence" as used herein may define a set of drop states used or useable by a given printing system in a given operating state.

An NPac space provides a large number of metamers. Metamerism is the existence of a multitude of combinations of reflectance and emission properties that result in the same perceived color for a fixed illuminant and observer. Multiple NPac vectors in an NPac space may have a similar colorimetry. Several NPac vectors may thus be useable to represent a given color. Different NPac vectors that have similar colorimetry may, however, have differing attributes other than colorimetry.

Each NPac vector may therefore define a probability distribution for colorant or printing fluid combinations for each pixel in the halftone (e.g. a likelihood that a particular colorant or printing fluid combination or available output state is to be placed or defined at each pixel location in the halftone). In this manner, a given NPac vector defines a set of halftone parameters that can be used in the halftoning process to map a color to NPs to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. This may result in discrete deposit instructions for print resolution pixels, e.g. instructing 0 to N drops of each of the k printing fluids on an addressable area of a print medium. Over a plurality of addressable areas, e.g. an area of print substrate, having a color defined by an NPac vector, the distribution of the printed output will tend towards the statistical distribution of area coverage defined by the NPac vector. An example of a printing pipeline that uses area coverage representations for halftone generation is a Halftone Area Neugebauer Separation (HANS) pipeline.

A color separation process may employ mappings between colors defined in a first color space and corresponding colors defined in a second color space. Such mappings may be stored in a data structure. For example, the mappings may be stored in a lookup table which may be accessed by the color separation process to map between color spaces. In some examples, a lookup table is used to map colorimetric values to vectors in an area coverage space. For example, the lookup table may map RGB or CMYK color values to NPac vectors. In some examples, the lookup table maps XYZ, LAB or any other color space used to specify a device color space. Where the vectors comprise NPac vectors, the lookup table may be referred to as a "HANS lookup table". When an RGB mapping is used, the HANS lookup table may comprise $17^3$ entries. When a CMYK mapping is used, the HANS lookup table may comprise $9^4$ entries. The HANS lookup table may comprise a one-to-one mapping from input color values to NPac vectors.

Determination of the mappings between corresponding color values in different color spaces may be a complex and/or time-consuming process. Determination of the mappings may involve printing and color-measuring NPac vectors, and then assigning NPac vectors to input color values (e.g. RGB values) in a color lookup table based on the measured colorimetries of the NPac vectors. Such assignment may be performed manually, e.g. using trial and error to define color transitions. Where the output color space is an NPac color space, the dimensionality is defined by the total number of NP states that are available for a given printing system in a given operating state, which in some cases may be in the order of 100,000 states or more. The total number of NP states is in turn dependent on the number of different colorants or printing fluids used by the printing system. The number of possible colorant combinations grows exponentially as additional colorants are introduced into the printing system. Some printing systems may use at least 9 colorants, with some colorants having multiple implementable drop-weight states. If a colorant channel is defined as a given colorant having a given implementable drop-weight state, printing systems may comprise 14 colorant channels or more. Accordingly, due to the size and/or dimensionality of NPac space, manual pre-calculation of mappings for population of a lookup table may be impractical.

In some cases, a HANS lookup table can be populated by manually selecting NPac vectors from a set of color-measured NPac vectors and assigning the selected NPac vectors to the vertices of an RGB cube. The assigned NPac vectors for the vertices may then be used to seed an interpolation process to obtain NPac vectors for the edges and the interior of the RGB cube. However, simply interpolating between the vertices of the RGB cube may allow relatively little control over which NPac vectors are derived for the edges and diagonals of the RGB cube. The edges and diagonals correspond to color transitions. Which NPac vectors are used for the edges and diagonals of the RGB cube can influence the resulting smoothness of such color transitions in NPac space, as well as other visual and non-visual metrics arising from the HANS lookup table, e.g. grain and colorant usage. Thus, simply interpolating between NPac vectors assigned to the vertices of the RGB cube allows little control over the resulting metrics or properties of the NPac vectors representing color transitions.

Color-measured NPac vectors, as with any color values, may be represented in a color space. Such a color space may be represented in three dimensions, referred to herein as a "3D color space". For example, color-measured NPac vectors may be represented in LAB space, where the position of a given NPac vector in LAB space corresponds to the measured colorimetry of that NPac vector. In some examples, the NPac vectors are represented in XYZ space.

FIG. 1 shows a printing system 100 according to an example. Certain examples described herein may be implemented within the context of this printing system.

The printing system 100 may be a 2D printing system such as an inkjet or digital offset printer, or a 3D printing system, otherwise known as an additive manufacturing system. In the example of FIG. 1, the printing system 100 comprises a printing device 110, a memory 120 and a print controller 130. The print controller 130 may be implemented using machine readable instructions executed by a processing device and/or suitably programmed or configured hardware.

The printing device 110 is arranged to apply a print material, e.g., a printing fluid to a print target in a printing process, to produce a print output 140. The print output 140 may, for example, comprise colored printing fluids deposited on a substrate. The printing device 110 may comprise an inkjet deposit mechanism, which may for example comprise a nozzle to deposit printing fluid on the substrate. The inkjet deposit mechanism may include circuitry to receive instructions associated with depositing printing fluid. The printing device 110 may comprise a multi-level drop-weight printing device. A multi-level drop-weight printing device is a printing device that is configured to deposit printing fluids with more than one possible drop-weight. In 2D printing systems, the substrate may be paper, fabric, plastic or any other suitable print medium.

In an example, the printing fluid may be referred to as a "colorant". A colorant may correspond to a given base color, where other colors may be formed from combinations of colorants. Examples of base colors include, but are not limited to, cyan, magenta, yellow, red, green and blue and black. The number of colorants implementable by the printing system 100 may be less than the number of possible colorant combinations, e.g. NPs, based on the given set of colorants.

In 3D printing systems, the print output 140 may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. The fusing agent and detailing agent may control a temperature of a bed of build material. The fusing agent may comprise an energy-absorbing chemical compound that acts to increase a temperature of a portion of build material. The detailing agent may comprise a cooling agent, such as a water-based liquid, that acts to reduce a temperature of a portion of build material. In this manner, a fusing agent may be selectively applied to a layer in areas where particles of the build material are to fuse together, and a detailing agent may be selectively applied where the fusing action is to be reduced. In some examples, the printing agents may comprise colorants and may be deposited on a white or blank powder to color the powder. In other examples, objects may be constructed from layers of fused colored powder.

The memory 120 is arranged to store, for a transition region between two input color space nodes in an input color space, data 150 representing a set of candidate output color space nodes in an output color space. A "set" of candidate output color space nodes comprises at least two candidate output color space nodes. A color space node may also be referred to as a "color value". A color space node may be representable within a color space by respective coordinates corresponding to the axes or dimensions that define the color space. For example, a color space node may have, for each of first, second and third axes defining a 3D color space, a respective coordinate. A color space node or value may thus indicate a position in a color space which corresponds to a color.

The transition region may be between two or more extremities on a surface of the input color space. In some examples, the transition region may be between two vertices in the input color space. In other words, the two input color space nodes may comprise vertices in the input color space. The input color space, which may be for example an RGB or CMYK color space, may be represented as a 3D cube. The cube has eight vertices, each vertex corresponding to one of the primary or secondary colors of the color space, or black or white. For example, the vertices may correspond to: red, green, blue, cyan, magenta, yellow, black and white. Each pair of vertices may be connected by a color transition or ramp. Examples of such transitions include white-red, cyan-blue, black-green, etc. A given transition, or transition region, may comprise a plurality of transition points along the transition. A color transition region may therefore be defined by a trajectory along successive transition points in a color space.

In some examples, the set of candidate output color space nodes comprises a set of NPac vectors. An NPac vector defines a statistical distribution of an operating set of colorant combinations, or NPs, implementable by the printing system 100 over an area of a halftone. The output color space may be an NPac color space. For example, the candidate output color values may comprise NPac vectors in NPac space. In some examples, the output color space is a CIELAB color space. The candidate output color values may comprise NPac vectors represented in CIELAB space, for example. The set of candidate output color space nodes may comprise other types of color values in other examples. For example, the set of candidate output color space nodes may comprise a set of colorant vectors. In some examples, the input color space is an RGB color space.

In examples where the set of candidate output color space nodes comprises a set of NPac vectors, the operating set of colorant combinations corresponds to an operating set of NPs. The operating set of colorant combinations may correspond to an operating state of the printing system 100 and/or of a printing process implemented by the printing system 100. An operating state may be a configuration of the printing system 100 that influences how the printing process is performed by the printing system 100. In examples, the operating state relates to a constraint of the printing process and/or of the printing system 100 implementing the printing process. For example, different printing systems may have different operating characteristics, relating to the constraints or capabilities of the different printing systems. In some examples, a given printing system may be configurable with different operating states, for example where a given operating state is associated with a given printing process of a plurality of printing processes performable by the printing system. A constraint may relate to the use of NPs over a HANS look-up table. An operating set of NPs may be a predetermined set of NPs over which a color look-up table can define NPac vectors. For example, the operating set of NPs may be dependent on a colorant drop sequence of a printing process performed by the printing system 100.

The set of candidate output color space nodes may be a subset of all available output color space nodes that are implementable by the printing system 100. The set of candidate output color space nodes may be considered a "sampled pool" of output color space nodes, from which output color space nodes that can represent the transition region may be selected and/or derived. In some examples, the set of candidate output color space nodes comprises combinations of colorants that are involved in the transition. For example, where the output color space nodes comprise NPac vectors, the set of candidate output color space nodes for a given transition may comprise NPac vectors which are formed from those NPs that include colorants that are involved in the given transition. In some examples, the set of output color space nodes does not comprise colorants that are not involved in the transition. The set of output color space nodes may comprise combinations of colorants that are involved in the transition up to a given colorant limit. The given colorant limit may be dependent on the print medium or substrate used by the printing system 100.

In some examples, the printing system 100 comprises a measurement device (not shown). The measurement device is arranged to obtain a measurement of an optical property of the color space nodes in the set of color space nodes. An example optical property to be measured is a reflectance spectrum. The measurement device may be arranged to obtain a measurement of the colorimetry of each output color space node in the set of candidate output color space nodes. The colorimetry may be measured from one or more printed patches. The measured colorimetries may be useable to derive coordinate values for each of first, second and third axes in a 3D color space for each of the candidate output color space nodes. For example, the measured colorimetries may be useable to represent the candidate output color space nodes in a CIELAB or XYZ color space. The measurement device may be an optical measurement device. The optical measurement device may comprise a color measurement device. Examples of optical measurement devices include, but are not limited to, photodiodes, spectrophotometers, spectrofluorometers, spectrocolorimeters, tristimulus colorimeters, densitometers and lightness sensors. In some examples, the measurement device is separate from the printing system 100.

The measurement device may be communicatively coupled to the printing system 100, for example via an interface (not shown). In an example, the interface comprises a physical connection. The physical connection may be, for example, a Universal Serial Bus (USB) and/or serial data connection to electrically couple a measurement device such as a spectrophotometer and/or colorimeter, wherein data values are transmitted using an appropriate communication protocol over the interface. The interface may comprise a wired or wireless interface. In an example, the interface comprises a user interface. The user interface may, for example, comprise graphical components such as form fields to receive color measurement data, e.g. data output by a separate measurement device. In some examples, the interface is to receive input from an optical measurement device.

The transition region comprises a sub-region. The sub-region may be referred to as a "bin" or "sub-division" of the transition region. The sub-region may comprise any part of the transition region excluding the end-points of the transition region. In some examples, the transition region comprises a plurality of sub-regions. A sub-region may be a division of a color space. The sub-region may comprise a one-dimensional (1D), two-dimensional (2D) or three-dimensional (3D) sub-region. A 1D, 2D or 3D sub-region may comprise a length, an area or a volume in a color space, respectively. For example, a 3D sub-region may comprise a cube in color space. The dimensionality of the sub-region may depend on the transition, e.g. the two or more input color values between which the transition is defined. For example, 1D sub-regions may be used for some color transitions, and 3D sub-regions may be used for other color transitions. 1D sub-regions may be used for transitions that involve a single printing fluid, for example. Where the set of candidate output color values is represented in a CIELAB color space, 1D sub-regions may correspond to L* slices in the color space. 3D sub-regions, on the other hand, may be used for transitions that involve multiple printing fluids. For example, a composite gray ramp involving cyan, magenta and yellow printing fluids may be divided into 3D sub-regions, e.g. cubes in color space. In some examples, the dimensionality of the sub-region is dependent on a complexity of the set of candidate output color space nodes. For example, the dimensionality of the sub-region may be dependent on the number of colorants used in the set of candidate output color space nodes.

The sub-region has an associated target colorimetry and an associated target attribute. The target colorimetry of the sub-region may be defined based on the trajectory through color space that represents the overall color transition of the transition region. For example, the target colorimetry of the sub-region may be selected from a discrete or continuous series of colorimetry values that together describe the transition region. The target colorimetry of the sub-region may be defined by the position in the color space of the sub-region. Different sub-regions of the transition region may have different associated target colorimetry values.

The target attribute may be considered a target value of a metric. For example, the target attribute may comprise a numerical value that a given metric can take. Such a metric may be associated with the transition region, as will be described in more detail below. The target attribute, which may be referred to as a "target metric value" or a "target metric score", is separate from the target colorimetry of the sub-region. In some examples, the target attribute is user-defined. The target attribute may be a print attribute. The target attribute may be an image quality attribute. For example, the target attribute may be a target attribute of a printed image. An example of a target attribute is a predetermined amount of colorant usage. The target attribute may be derivable based on a print mode or operating state of the printing system 100. For example, different operating states may have different constraints or considerations that inform which target attribute(s) is to be used.

In some examples, different sub-regions of the transition region have different associated target metric values. In other words, the value of the target metric may vary over the transition region. In some examples, different sub-regions of the transition region have the same associated target metric value. In other words, the target value of the metric may be uniform over some or all of the transition region.

The print controller 130 is arranged to select, from the set of candidate output color space nodes, an output color space node having an associated attribute and colorimetry. The selecting is based on the colorimetry of the output color space node and the target colorimetry. The selecting is also based on the attribute of the color space node and the target attribute. In some examples, the print controller 130 is arranged to compare the colorimetry of the output color space node with the target colorimetry of the sub-region. In some examples, the print controller 130 is arranged to select the output color space node without comparing the colorimetry of the output color space with the target colorimetry. The print controller 130 may be further arranged to compare the attribute of the output color space node with the target attribute of the sub-region. In other examples, the print controller 130 is arranged to select the output color space node without comparing the attribute of the output color space node with the target attribute. For example, if a target value of a given metric is zero, the print controller 130 may select an output color space node having a value of the metric that is smaller than that of any other output color space node, but without directly comparing the value of the metric to the target value. Different output color space nodes in the set of candidate output color space nodes may have different associated attributes. Different output color space nodes in the set of candidate output color space nodes may have different associated attributes but the same or similar colorimetry values.

The associated attribute of the output color space node may correspond to a print or image attribute of the output color space node once the output color space node is printed. In some examples, the attribute of the output color space node is derived computationally. For example, where the output color space node comprises an NPac vector and the attribute is a printing fluid consumption, the printing fluid consumption of the NPac vector may be immediately derivable from the components of the NPac vector. In some examples, the attribute of the output color space node is derived by obtaining a measurement of the associated attribute. For example, a test patch corresponding to an NPac vector may be printed and optically measured in order to derive an attribute corresponding to an amount of grain for the NPac vector.

In some examples, a subset of the set of candidate output color space nodes is first selected based on the colorimetry of each of the candidate output color space nodes and the target colorimetry of the sub-region. The subset of candidate output color space nodes may thus comprise output color space nodes that have a colorimetry that matches or is similar to the target colorimetry. In other words, the subset of candidate output color nodes are those output color nodes which, when represented in a color space, fall within the sub-region, since the sub-region is a sub-region of the color space which has a corresponding colorimetry, namely the target colorimetry. Once the subset of candidate output color space nodes is chosen based on colorimetry, the associated attributes of each candidate output color space node of the subset may be compared with the target attribute for the sub-region, and an output color space node from the subset of candidate output color space nodes may be selected based on its associated attribute and the target attribute.

In other examples, a subset of the set of candidate output color space nodes is selected based on the associated attribute of each of the candidate output color space nodes and the target attribute for the sub-region. For example, the subset of candidate output color space nodes may comprise output color space nodes that have an associated attribute which is similar to the target attribute. Once the subset of candidate output color space nodes is chosen, the colorimetry of each candidate output color space node of the subset may be compared with the target colorimetry for the sub-region, and an output color space node from the subset of candidate output color space nodes may be selected based on its associated colorimetry and the target colorimetry.

The print controller 130 is further arranged to derive a set of halftone parameters for the transition region based on the selected output color space node. In some examples, the set of halftone parameters comprises a set of NPac vectors. The set of halftone parameters may be derived by interpolating between a plurality of selected output color space nodes. In some examples, the set of halftone parameters comprises the selected output color space node.

In some examples, the memory 120 comprises a lookup table for storing data mapping an input color space to an output color space. The lookup table may store data mapping all or part of the input color space to all or part of the output color space. Data indicating the derived set of halftone parameters may be stored in the lookup table. For example, the lookup table may map colorimetric values to vectors in an area coverage space. Each vector in area coverage space may comprise a set of halftone parameters. In some examples, the lookup table maps RGB or CMYK color values to NPac vectors.

The print controller 130 is further arranged to cause the printing device 110 to use the derived set of halftone parameters in a printing process. For example, print instructions may be received, comprising color values in an input color space. The print controller 130 may transform the color values in the input color space to halftone parameters using the lookup table which stores the data mapping the input color space to the output color space, and apply the halftone parameters indicated in the lookup table during the printing process.

In some examples, the print controller 130 is arranged to select one or more further output color space nodes for one or more further sub-regions of the transition region and/or for one or more further transition regions. This results in a distribution of selected output color space nodes in the color space, one per sub-region, which are selected according to their associated attributes. The distribution of selected output color space nodes may be used to seed an interpolation operation, as will be described in more detail below.

Figure 2:
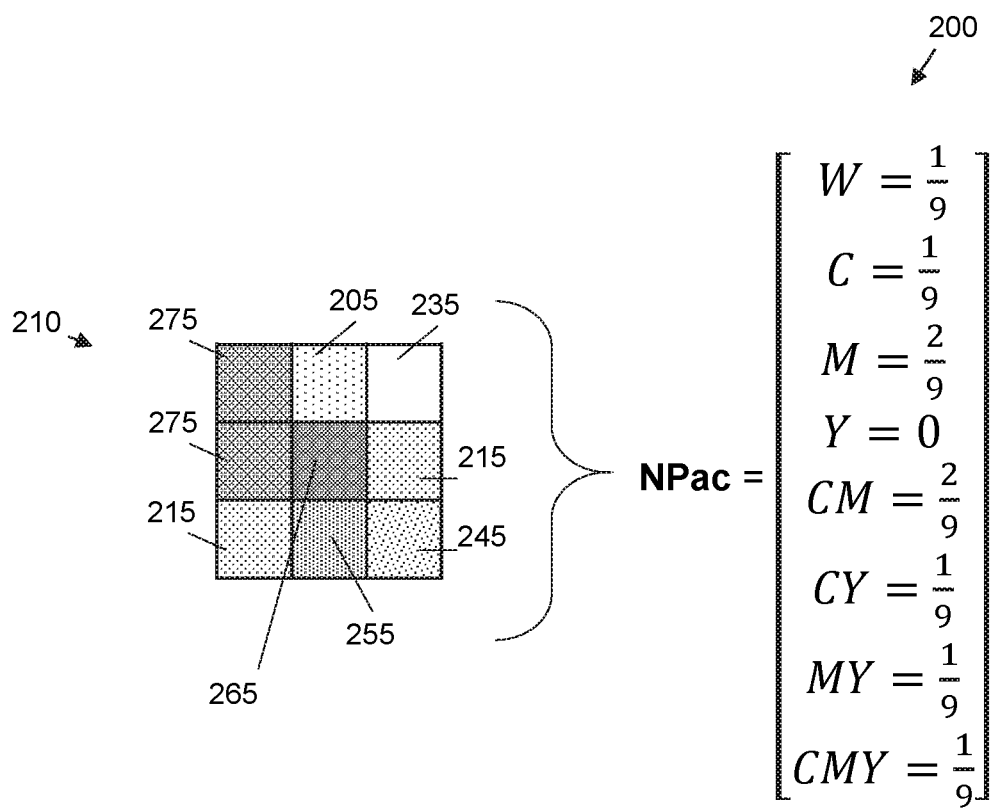
FIG. 2 is a schematic diagram showing a representation of a Neugebauer Primary area coverage vector according to an example.

FIG. 2 shows an example NPac vector 200 for use in a CMY imaging system. The NPac vector 200 may correspond to an output color space node derived in accordance with examples described herein. This example shows a three-by-three pixel area 210 of a print output where all pixels have the same NPac vector: vector 200. The NPac vector 200 defines the probability distributions for each NP for each pixel, for example a likelihood that $NP_x$ is to be placed at the pixel location. Hence, in the example print output there is one pixel of White (W) (235); one pixel of Cyan (C) (245); two pixels of Magenta (M) (215); no pixels of Yellow (Y); two pixels of Cyan+Magenta (CM) (275); one pixel of Cyan+Yellow (CY) (255); one pixel of Magenta+Yellow (MY) (205); and one pixel of Cyan+Magenta+Yellow (CMY) (265). Generally, the print output of a given area is generated such that the probability distributions set by the NPac vectors of each pixel are fulfilled. For example, the NPac vector may be effected by a halftone stage that implements the spatial distribution of colorants combinations defined by the vector, e.g. via a series of geometric shapes such as dots of predetermined sizes being arranged at predetermined angles. As such, an NPac vector is representative of the colorant overprint statistics of a given area. Although a CMY system is used for ease of explanation, other imaging systems may be used.

Figure 3:
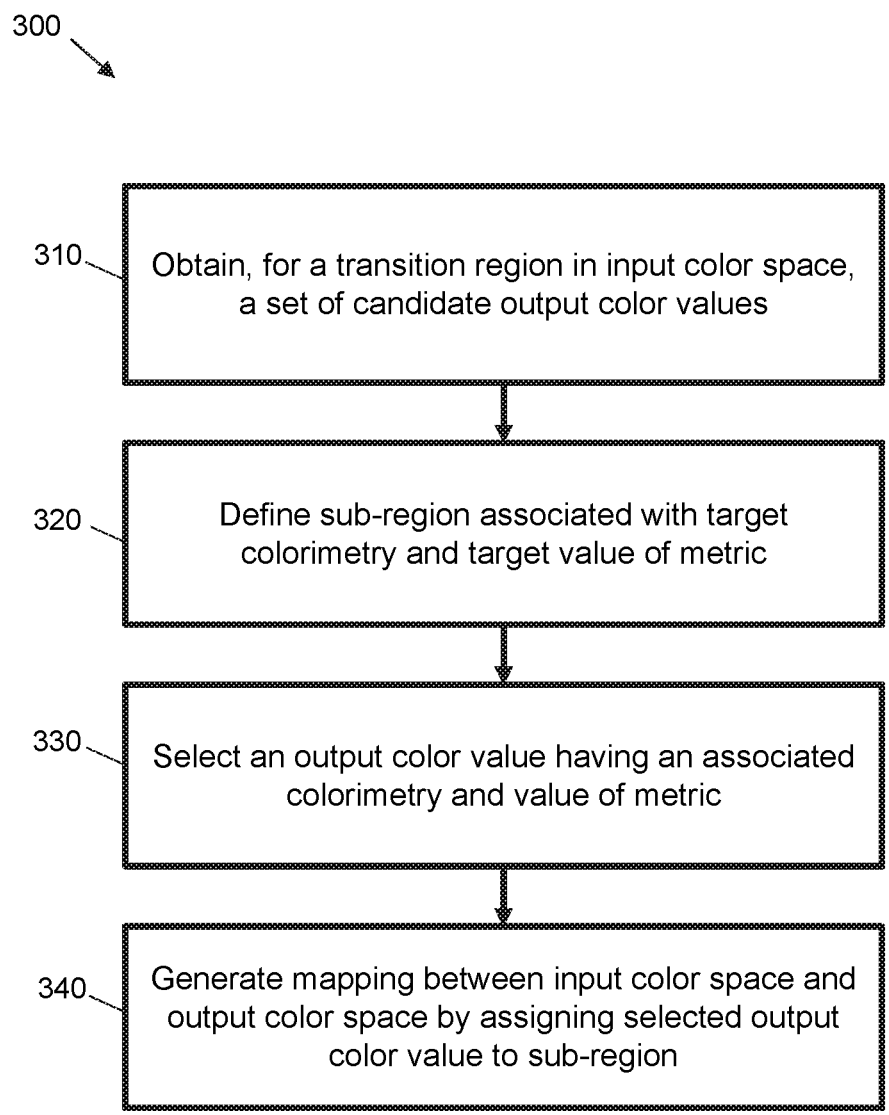
FIG. 3 is a flow chart illustrating a method according to an example.

FIG. 3 shows a method 300 according to an example. In some examples, the method 300 is performed by a print controller such as the print controller 130 described with reference to FIG. 1. The print controller 130 may perform the method 300 based on instructions retrieved from a computer-readable storage medium. The printing system may comprise printing system 100.

At item 310, data representing a set of candidate output color values in an output color space is obtained for a transition region. The transition region is between two input color values in an input color space. The two input color values are thus end-points for the transition region. In some examples, the input color values are vertices in the input color space and the transition region is between the two vertices in the input color space.

In some examples, the data representing the set of candidate output color values comprises the set of candidate output color values. In some examples, the data representing the set of candidate output color values comprises coordinate values for the set of candidate output color values. Each candidate output color value may have, for each of first, second and third axes defining a 3D color space, a respective coordinate value. The data representing the set of candidate output color values may be generated, e.g. by the print controller 130, or may be received from a further entity.

In some examples, the set of output color values comprises a set of area coverage vectors. An area coverage vector comprises a set of components that are to be distributed over an area of a halftone. As such, the set of output color values may comprise a set of halftone parameters. An example of an area coverage vector is an NPac vector. In some examples, the set of output color values comprises a set of colorant-use vectors. A colorant-use vector may be an area coverage vector. A colorant-use vector comprises components corresponding to individual colorants implementable by the printing system. Values of the components correspond respectively to the amount of the corresponding colorant used relative to the other colorants represented in the colorant-use vector. The output color space may be a print color space.

In some examples, the data representing the set of candidate output color values is derived based on measurement data. For example, the colorimetry of a given output color value in the set of candidate output color values may be derived based on a measurement of the given output color value. Such measurement data may be received from a measurement device. The measurement device may be comprised in or separate from the printing system. The measurement data may be indicative of an optical property of a printed test patch. The measurement data may be indicative of a colorimetry of each of the set of candidate output color values. In some examples, the measurement data is received from a memory. The memory may be comprised in or separate from the printing system.

At item 320, a sub-region of the transition region is defined. The sub-region is associated with a target colorimetry and a target value of a metric. The metric may be referred to as a "first metric". The metric may be associated with the transition region. The metric may comprise a print metric. A print metric corresponds to a metric of a printing process and/or of a printed output. In an example, the metric corresponds to a ratio between high and low drop weight colorant usage. In another example, the metric corresponds to an overall printing fluid consumption. In a further example, the metric corresponds to an amount of grain. In another example, the metric corresponds to a gamut size. In a further example, the metric corresponds to a ratio between black and non-black printing fluid usage. In another example, the metric corresponds to a number of different colorants used. The target value of the metric may be a numerical value. In some examples, the metric may have a range of possible values, ranging from a smallest possible value to a largest possible value. For example, the metric may take values ranging from 0 to 1. In some examples, the target value of the metric is the smallest possible value of the metric. In other examples, the target value of the metric is the largest possible value of the metric. In some examples, the target value of the metric is intermediate the smallest possible value of the metric and the largest possible value of the metric. For example, if the metric can take values ranging from 0 to 1, the target value of the metric may be 0.5.

At item 330, a given output color value is selected from the set of candidate output color values. The given output color value has an associated value of the metric and an associated colorimetry. The selecting is based on the associated colorimetry of the given output color value and the target colorimetry for the sub-region. The selecting is also based on the value of the metric associated with the given output color value and the target value of the metric associated with the sub-region.

In some examples, the set of candidate output color values comprises two candidate output color values having the same associated colorimetry as each other, or having associated colorimetries that are within a threshold distance from each other. The two candidate output color values may, however, have different associated values of the metric. As such, the two candidate output color values may be distinguished from one another based on the associated values of the metric.

In some examples, the selected output color value comprises an NPac vector. For example, a given NPac vector may be selected from a set of candidate NPac vectors.

At item 340, mapping data is generated. The mapping data is generated by assigning the selected given output color value to the sub-region. The mapping data is arranged to map the input color space to the output color space.

In some examples, the mapping data is stored in a color lookup table. The color lookup table may be stored in a memory of the printing system, for example. In examples where the set of candidate output color values comprises a set of NPac vectors, the color lookup table may comprises a HANS lookup table. In some examples, the mapping data is stored in a format other than a color lookup table.

In some examples, print control data is received for a printing operation. The print control data comprises a set of input color values in the input color space. The set of input color values can comprise one or more than one input color value. In other words, the set of input color values in the input color space may be provided as an input for a printing operation. The generated mapping data may then be used to perform the printing operation. For example, the mapping data may be used to map from the received input color value or values to output color values in the output color space, which may be a print color space, such that the output color values can be used in the printing operation. Therefore, the set of color values comprised in the print control data, namely the set of input color values, may be expressed as color values in the print color space of the printer, namely the set of output color values, in order for the printer to perform the printing operation based on the print control data.

In some examples, an additional output color value is selected based on a target value of a further metric, the further metric being different from the first metric. In some examples, the additional output color value is selected from the set of candidate output color values. In other examples, the additional output color value is selected from a further set of candidate output color values. The selecting the additional output color value may be for a further transition region. The further transition region has as an end-point a further input color value, different from the two input color values between which the first transition region is defined. In other words, the further transition region has at least one end-point that is different than the end-points of the first transition region. In some examples, both end-points of the further transition region are different from the end-points of the first transition region. In other examples, one of the end-points of the further transition region is the same as one of the end-points of the first transition region, namely one of the input color values. As such, different metrics may be used to select output color values for different color transitions. For example, a first metric may be used to select output color values for a transition of white to green, and a second, different metric may be used to select output color values for a transition of black to red. Different transition regions may have different corresponding sets of candidate output color values, from which output color values may be selected.

In some examples, the sub-region of the target region defined at item 320 is associated with a target value of a further metric, as well as the target value of the first metric. The further metric and/or the target value of the further metric may be the same as or different from the further metric and/or the target value of the further metric for the further transition region described above. The additional output color value may be selected from the set of candidate output color values, namely the set of candidate output color values associated with the transition. The additional output color value may have an associated value of the further metric and an associated colorimetry. The selecting may be based on the associated colorimetry of the additional output color value and the target colorimetry. The selecting may be further based on the value of the further metric and the target value of the further metric. The selected further output color value may be assigned to the sub-region. In some examples, further mapping data is generated by assigning the selected further output color value to the sub-region. The further mapping data is arranged to map between the input color space and the output color space. As such, two sets of mapping data may be generated for a given transition, each being associated with a different metric. The two sets of mapping data may be stored in respective color lookup tables, or in a single color lookup table. In other words, one mapping may be generated based on a first metric, and a second mapping between the same color spaces and for the same color transition may be generated based on a second, different metric.

Figure 4:
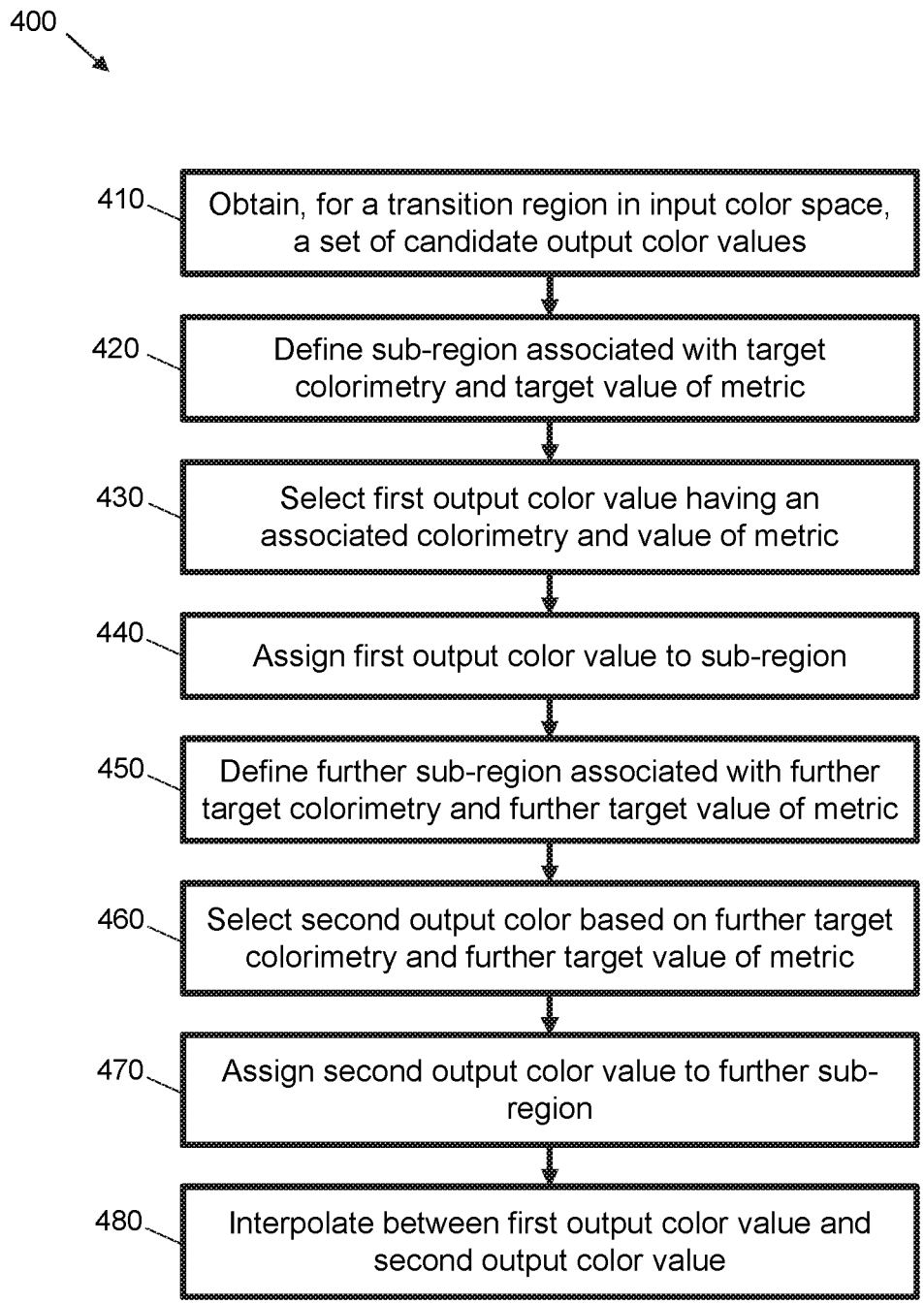
FIG. 4 is a flow chart illustrating a method according to an example.

FIG. 4 shows a method 400 according to an example. In some examples, the method 400 is performed by a print controller such as the print controller 130 described with reference to FIG. 1. The print controller 130 may perform the method 400 based on instructions retrieved from a computer-readable storage medium. The printing system may comprise printing system 100.

At item 410, data representing a set of candidate output color values in an output color space is obtained for a transition region between two input color values in an input color space.

At item 420, a sub-region of the transition region is defined. The sub-region is associated with a target colorimetry and a target value of a metric.

At item 430, a given output color value is selected from the set of candidate output color values. The given output color value has an associated value of the metric and an associated colorimetry. The selecting is based on the associated colorimetry and the target colorimetry. The selecting is further based on the value of the metric and the target value of the metric.

At item 440, the selected given output color value is assigned to the sub-region. The assigning of the selected given output color value to the sub-region may form part of the generating of mapping data that is arranged to map the input color space to the output color space. The mapping data may be arranged to map all or part of the input space to the output space.

At item 450, a further sub-region of the transition region is defined. In some examples, the further sub-region is contiguous in the transition region with the sub-region defined at item 420. In other examples, the further sub-region is non-contiguous with, or spaced apart from, the sub-region defined at item 420. The further sub-region is associated with a further target colorimetry. The further target colorimetry is different from the target colorimetry that is associated with the sub-region defined at item 420. The further sub-region is also associated with a further target value of the metric. The further target value of the metric may be different from the target value of the metric associated with the sub-region defined at item 420. As such, the metric may have different target values for different sub-regions of the transition region. In some examples, the further target value of the metric is the same as the target value of the metric associated with the sub-region defined at item 420. As such, the metric may have the same target value for different sub-regions of the transition region. In some examples, the metric has the same target value for the entirety of the transition region.

At item 460, a further output color value is selected from the set of candidate output color values. The further output color value is selected based on the further target colorimetry and the further target value of the metric. The further output color value may have an associated colorimetry and an associated value of the metric. The selecting of the further output color value may be based on the colorimetry of the further output color value and the further target colorimetry, and the value of the metric associated with the further output color value and the further target value of the metric.

At item 470, the selected further output color value is assigned to the further sub-region. The assigning of the selected further output color value to the further sub-region may form part of the generating of mapping data that is arranged to map the input color space to the output color space.

At item 480, an interpolated output color value is derived. The interpolated output color value is derived by interpolating between the selected given output color value and the selected further output color value. In some examples, the interpolated output color value is comprised in the set of candidate output color values. In other examples, the interpolated output color value is not comprised in the set of candidate output color values. In some examples, the interpolated output color value is derived by triangulating between multiple color values. Triangulation may comprise calculating a weighted average among multiple color values. Such a weighted average may be calculated using a barycentric coordinate system or a trilinear coordinate system, for example. In some examples, the interpolated output color value is derived by performing Delaunay tessellation in a predetermined number of dimensions. The predetermined number of dimensions may correspond to the number of dimensions of the sub-region. The interpolated output color value may be indicated in the mapping data that maps the input color space to the output color space. As such, the mapping data may include the given output color value, the further output color value and the interpolated output color value. These output color values may describe a color transition corresponding to the transition region in input space. In some examples, further output color values are selected for further sub-regions of the transition region, and/or are derived by interpolating between selected output color values.

At least some of items 410 to 480 may be repeated for other color transitions in the input color space. For example, where the input color space is represented as an RGB cube, the above items may be repeated for other transitions or ramps between vertices of the RGB cube, e.g. transitions corresponding to edges or diagonals of the RGB cube. The transitions that can be processed using the above methods include: white to each of red, green, blue, cyan, magenta, yellow, and black; black to each of red, green, blue, cyan, magenta, yellow, and white; and each non-white non-black color to its adjacent colors in the RGB cube. Transitions from white to non-white colors may be processed prior to transitions from black to non-black colors and prior to transitions from non-white non-black colors to their adjacent colors. Transitions from black to non-black colors and from non-white non-black colors to their adjacent colors effectively join the ends of the transitions from white to non-white colors. The transitions from white to non-white colors are therefore processed first. Different metrics may be used to select output color values for different transitions.

Repeating items 410 to 480 for different edges and/or diagonals of the RGB cube produces a "skeleton" of the RGB cube. The "skeleton" is formed from selected output color values for sub-regions of each transition, and interpolated output color values between those selected output color space values for each transition. The "skeleton" is then used to interpolate the interior of the RGB cube, to obtain a mapping for the entirety of the input color space to the output color space. The mapping may be stored in a color lookup table, for example. In some examples, a smoothing process is applied to the mapping. The output color values indicated in the mapping may be optimized, for example by applying a linear programming (LP) method. The LP method may be based on a constraint of a print mode or operating state of the printing system, and may be used to optimize the mapping for that print mode or operating state.

Figure 5:
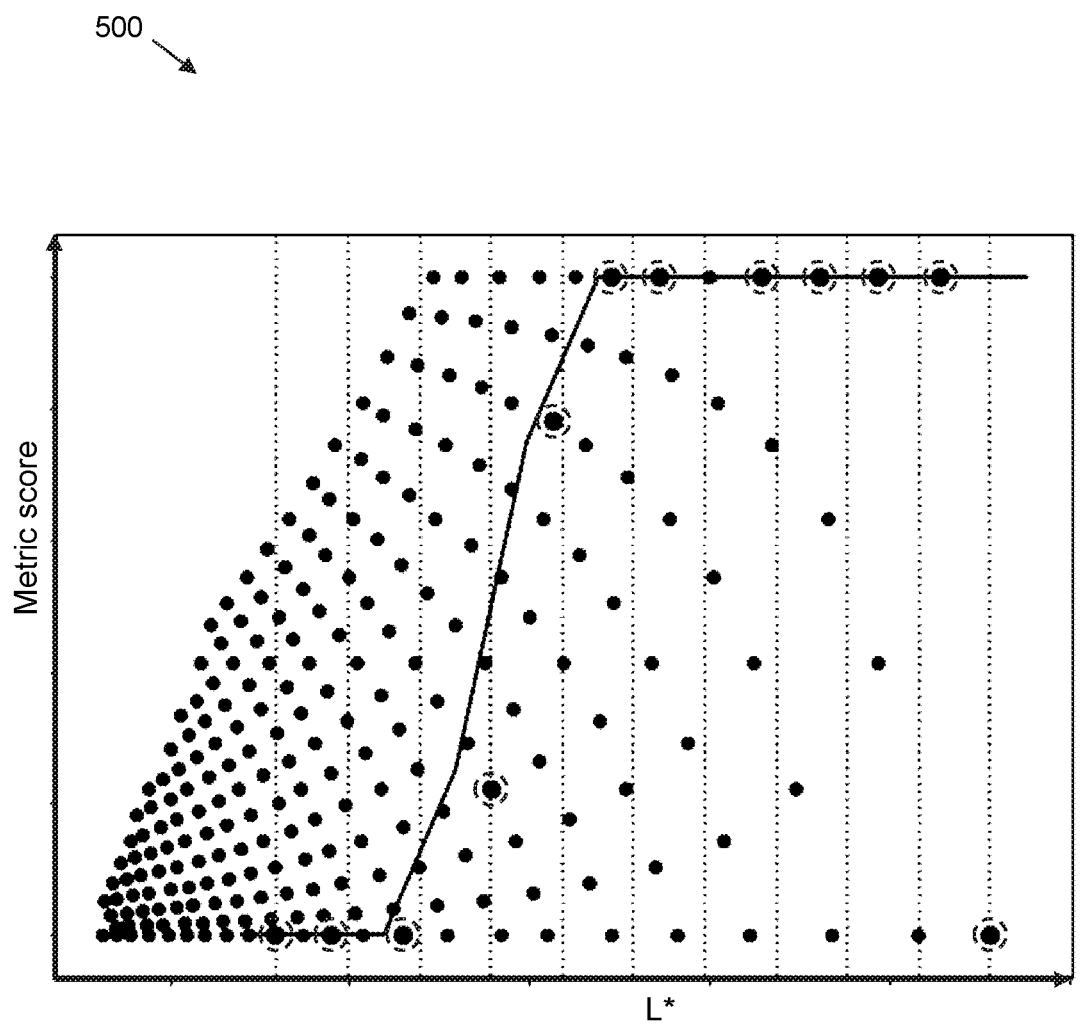
FIG. 5 is a graph showing metric scores for candidate output color values in a color transition versus lightness.

FIG. 5 is a graph 500 showing metric scores for candidate output color values in a color transition versus lightness. In this example, lightness corresponds to a range of L* values for a CIELAB color space. In this example, the color transition is a transition from white to cyan. Each point in the graph 500 corresponds to a candidate output color value. In this example, the set of candidate output color values comprises a set of measured NPac vectors that use NPs involving a cyan colorant. In this example, cyan colorants of multiple drop-weights are used. Examples of such NPs thus include c, C, cc, cC, CC, etc., where c and C correspond to different drop-weights.

In this example, the metric comprises a ratio between high and low drop-weight usage. A higher metric score indicates a greater low drop-weight usage relative to high drop-weight usage, and a lower metric score indicates a greater high drop-weight usage relative to low drop-weight usage.

The transition is divided into sub-regions, or bins, the boundaries of which are depicted with dotted lines in the graph 500. Since this transition involves a single color and white, the sub-regions are 1D sub-regions corresponding to L* slices. Each sub-region is associated with a respective sub-range of L* values, corresponding to a different colorimetry. In this example, multiple candidate output color values are located in each sub-region. In other words, multiple candidate output color values have a colorimetry which matches, or is similar to, the colorimetry for a given sub-region.

In the graph 500, the solid line connects target values for the metric for each sub-region. That is, each sub-region has an associated target value of the metric. A target value may be referred to as a target score. In this example, the target score varies over the transition. For the left-most part of the graph 500, corresponding to lower L* values and thus darker colors, a lower target score is used, indicating more high drop-weight usage relative to low drop-weight usage. The lower target score may be zero, for example. For the right-most part of the graph 500, corresponding to higher L* values and thus lighter colors, a higher target score is used, indicating more low drop-weight usage relative to high drop-weight usage. The higher target score may be one, for example. For a central part of the graph 500, between the left-most part and the right-most part, the target score increases from the lower target score to the higher target score, e.g. from zero to one. In this region of the transition, the target score is intermediate the lower target score and the higher target score. As such, the target score may, for at least part of a transition, be between two possible extreme values for the target score.

For each sub-region, an output color value within the sub-region is selected based on the target metric score and the metric score of the output color value. For example, an output color value may be selected based on a determination that the metric score of the output color value is closer than the metric score of any other candidate output color value in the sub-region to the target metric score. The selected output color value for each sub-region is depicted with a dashed circle in the graph 500.

As described above, different metrics or criteria may be used to select output color values for different transitions.

For transitions from white to cyan, magenta or yellow (the so-called 'primary colors') with dual drop-weight states, grain may be reduced by using low drop-weight color space nodes until grain is not visible and then introducing high drop-weight color space nodes so as to not force a firing frequency in any of the drop-weights and thus avoid banding and/or aerodynamic image quality defects.

For transitions from white to black using multiple black printing fluids (e.g. dual drop-weight gray, dual drop-weight photo black, matte black, etc.), darker printing fluids can be introduced at the points where their respective grain is not visible. As such, all black colorants may be utilized at the same time, instead of switching from colorant to colorant with an overlap of at most two colorants, as in a comparative case. Trenches may be kept at low frequency, and a quantity of lighter colorants may be kept throughout the full transition, allowing for reduced grain. A relatively large number of colorants may thus be managed simultaneously, which may be difficult without using the examples described herein.

Transitions from white to red, green or blue (the so-called 'secondary colors') can involve a large number of colorants. For example, a white to blue transition may involve cyan, magenta, and blue, all with dual drop-weights, resulting in a total of 6 colorant channels. Examples described herein may allow such complexity to be managed with less difficulty than would be the case without using the examples described herein. Secondary transitions may be generated, which traverse from low drop-weight mixtures to high drop-weight chromatic colorants (e.g. pure red, green or blue), resulting in smooth color transitions having a stable hue and a reduced grain, whilst enabling certain colorant mixtures that introduce defects to be avoided.

For transitions from primary and secondary colors to black, there may be a trade-off between colorant usage and gamut. A minimum quantity of colorant may be used for such transitions that yields a convex gamut.

For transitions between hue-adjacent pairs of colors (so-called 'color-to-color transitions'), lighter colorants may be gradually introduced through the transition. For example, for a transition from yellow to red, a low drop-weight magenta colorant may be introduced before introducing the red colorant. Such methods reduce grain and enable a smoother transition compared to a case in which simple interpolation between RGB vertices is performed. In such a comparative case, yellow and red colorants may be mixed in the interpolated color values, which may result in undesirable levels of grain.

In some examples, a set of metrics may be chosen by a user of the printing system. For example, a user may choose to favor savings in printing fluid consumption versus gamut or image quality. The printing system controller may then compute a set of ramps that satisfies the selected metrics. The ramps may be derived from a characterization set obtained in an offline state.

Figure 6:
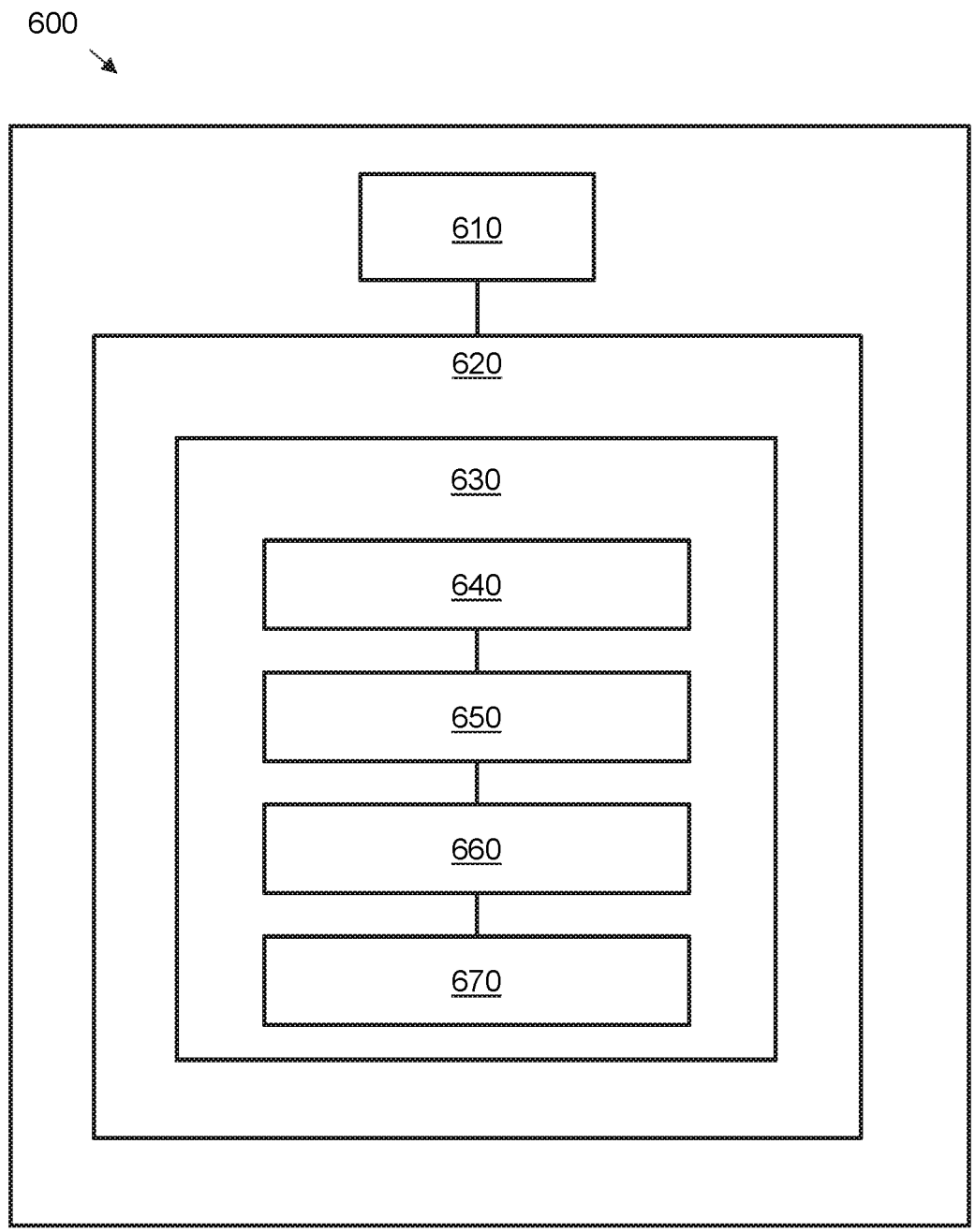
FIG. 6 is a schematic diagram of a processor and a computer readable storage medium with instructions stored thereon according to an example.

FIG. 6 shows example components of a printing system 600, which may be arranged to implement certain examples described herein. A processor 610 of the printing system 600 is connectably coupled to a computer-readable storage medium 620 comprising a set of computer-readable instructions 630 stored thereon, which may be executed by the processor 610. The printing system 600 may comprise a printing system similar to printing system 100.

Instruction 640 instructs the processor 610 to obtain, for a transition region between two input color values in an input color space, data representing a set of candidate output color values in an output color space. The set of candidate output color values may comprise a set of candidate NPac vectors, for example.

Instruction 650 instructs the processor 610 to define a sub-region of the transition region. The defined sub-region is associated with a target colorimetry and a target metric value.

Instruction 660 instructs the processor 610 to select, from the set of candidate output color values, an output color value having an associated metric value and an associated colorimetry. The selecting is based on the colorimetry and the target colorimetry. The selecting is further based on the metric value and the target metric value.

Instruction 670 instructs the processor 610 to generate output data associating the selected output color value with the sub-region. In some examples, the generated output data is stored in a color look-up table. The color look-up table may be stored in a memory of the printing system 600. As such, the output data may map the input color space to the output color space. Input color values in the input color values may be input to the printing system 600 as part of printing instructions, and subsequently converted to output color values by the processor 610 using the output data, to allow a printing operation to be performed using the output color values. The output color space may comprise a print color space, for example.

Processor 610 can include a microprocessor, microcontroller, processor module or subsystem, programmable integrated circuit, programmable gate array, or another control or computing device. The computer-readable storage medium 620 can be implemented as one or multiple computer-readable storage media. The computer-readable storage medium 620 includes different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The computer-readable instructions 630 can be stored on one computer-readable storage medium, or alternatively, can be stored on multiple computer-readable storage media. The computer-readable storage medium 620 or media can be located either in the printing system 600 or located at a remote site from which computer-readable instructions can be downloaded over a network for execution by the processor 610.

Certain examples described herein enable sets of NPac vectors to be selected and/or derived which produce smooth, visually pleasing color transitions. Thus, a resulting visual quality of output images may be increased compared to a case in which the examples described herein are not used. By selecting NPac vectors for a color transition from a set of color-measured NPac vectors based on target metric values as well as colorimetry, finer control may be obtained in the selection and/or derivation of NPac vectors to represent the color transitions. The likelihood of obtaining NPac vectors which have undesirable properties is reduced, thus increasing the resulting visual quality of the transition.

Certain examples described herein enable a color lookup table mapping between color spaces to be populated computationally. Such examples may be less time-consuming, less error-prone and involve less user burden than comparative methods in which lookup tables are populated manually, e.g. through trial and error. Computational methods such as those described herein may be performed without a human expert being present to visually inspect and/or select color values to populate the lookup table.

Certain examples described herein enable smooth transitions to be obtained in a print color space, where a given transition involves multiple different printing fluids. For such complex color transitions involving several printing fluids or colorants, there may be a large number of NPac vectors having a similar colorimetry but different attributes. The attributes of NPac vectors influence the properties of a printed output. Some attributes may be more desirable than others, e.g. in terms of output grain, colorant usage, etc. Selecting NPac vectors for sub-regions of a transition based on target attributes in addition to colorimetry allows finer control of such properties. Thus, smooth transitions having desired properties may be obtained even for complex cases involving multiple different colorants.

Certain examples described herein enable a gamut of a print color space of a printer to be increased, thereby increasing a visual quality of a printed output. By binning transition regions and selecting an NPac vector per bin, rather than interpolating between the end-points of the transition region, a wide gamut may be produced, since the resulting print color space includes an NPac vector with a colorimetry corresponding to every bin.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
    obtaining, for a transition region between first and second extreme input color values in an input color space, data representing a set of candidate output color values in an output color space, wherein the transition region includes a plurality of sub-regions representing a plurality of colors between the first and second extreme input color values;
    identifying a first sub-region from the plurality of sub-regions of the transition region, the first sub-region being associated with a first target colorimetry and a first target value of a metric, wherein the first target colorimetry is a measurement of a first target color at the first sub-region in the input color space, and wherein the first target value of the metric indicates an amount of a colorant to be consumed relative to other colorants to produce the first target color;
    selecting, from the set of candidate output color values, a first output color value to correspond to the first target color at the first sub-region of the input color space, the first output color value having an associated value of the metric and an associated colorimetry, wherein the first output color value is selected based on:
        the associated colorimetry of the first output color value and the first target colorimetry of the first sub-region of the input color space, and
        the associated value of the metric of the first output color value and the first target value of the metric of the first sub-region of the input color space; and
    generating mapping data by assigning the selected first output color value to the first sub-region of the input color space, wherein the generated mapping data is to be used to map a set of input color values to a set of output color values for a printing operation.

2. The method of claim 1, wherein the selected first output color value comprises a Neugebauer Primary Area Coverage (NPac) vector defining a statistical distribution of Neugebauer Primaries (NPs) over an area of a halftone.

3. The method of claim 1, the method comprising storing the mapping data in a color lookup table.

4. The method of claim 1, the method comprising:
identifying a second sub-region from the plurality of sub-regions of the transition region, the second sub-region being associated with a second target colorimetry and a second target value of the metric, the second target colorimetry being different from the first target colorimetry of the first sub-region; and
selecting, from the set of candidate output color values, a second output color value to correspond to the second sub-region of the input color space, the second output color value having an associated colorimetry of the second output color value and an associated value of the metric of the second output color value, wherein the second output color value is selected based on:
the associated colorimetry of the second output color value and the second target colorimetry of the second sub-region of the input color space, and
the associated value of the metric of the second output color value and the second target value of the metric of the second sub-region of the input color space,
wherein the generating the mapping data comprises assigning the selected second output color value to the second sub-region.

5. The method of claim 4, wherein the generating the mapping data comprises interpolating between the first output color value and the second output color value to derive an interpolated output color value, wherein the mapping data is arranged to indicate the interpolated output color value.

6. The method of claim 4, wherein the first target value of the metric is different from the second target value of the metric.

7. The method of claim 1, wherein the metric corresponds to a ratio between high and low drop weight colorant usage.

8. The method of claim 1, wherein the set of candidate output color values comprises two candidate output color values having a same associated colorimetry as each other.

9. The method of claim 1, the method comprising selecting an additional output color value based on a further target value of a further metric.

10. The method of claim 9, wherein the selecting the additional output color value is for a further transition region, the further transition region having as an end-point a further extreme input color value, different from the first and second extreme input color values.

11. The method of claim 9,
wherein the first sub-region is further associated with the further target value of the further metric,
wherein the selecting the additional output color value comprises selecting the additional output color value from the set of candidate output color values, the additional output color value having an associated value of the further metric and an associated colorimetry of the additional output color value, wherein the additional output color value is selected based on:
the associated colorimetry of the additional output color value and the first target colorimetry of the first sub-region, and
the associated value of the further metric of the additional output color value and the further target value of the further metric of the first sub-region; and
the method comprising generating further mapping data by assigning the selected further output color value to the first sub-region; the further mapping data being arranged to map between the input color space and the output color space.

12. The method of claim 1, comprising:
receiving print control data for the printing operation, the print control data comprising the set of input color values in the input color space; and
using the generated mapping data to perform the printing operation.

13. The method of claim 1, wherein the first and second extreme input color values comprise vertices in the input color space.

14. A printing system comprising:
a printing device to apply a print material to a print target in a printing process;
a memory storing, for a transition region between first and second extreme input color space nodes in an input color space, data representing a set of candidate output color space nodes in an output color space, the transition region comprising a plurality of sub-regions representing a plurality of colors between the first and second extreme input color space nodes; and
a print controller to:
identify a first sub-region from the plurality of sub-regions of the transition region, the first sub-region being associated with a target colorimetry and a target attribute, wherein the target colorimetry is a measurement of a target color at the first sub-region of the input color space, and wherein the target attribute indicates an amount of a colorant to be consumed relative to other colorants to produce the target color;
select, from the set of candidate output color space nodes, a first output color space node to correspond to the target color at the first sub-region of the input color space, the first output color space node having an associated attribute and an associated colorimetry, wherein the first output color space node is selected based on:
the associated colorimetry of the first output color space node and the target colorimetry of the first sub-region of the input color space, and
the associated attribute of the first output color space node and the target attribute of the first sub-region of the input color space;
derive a set of halftone parameters for the transition region based on the first output color space node; and
cause the printing device to use the set of halftone parameters in the printing process.

15. A non-transitory computer-readable storage medium storing computer-readable instructions that, when executed by a processor of a printing system, cause the processor to:
obtain, for a transition region between first and second extreme input color values in an input color space, data representing a set of candidate output color values in an output color space, wherein the transition region includes a plurality of sub-regions representing a plurality of colors between the first and second extreme input color values;
identify a first sub-region from the plurality of sub-regions of the transition region, the first sub-region being associated with a target colorimetry and a target metric value, wherein the target colorimetry is a measurement of a target color at the first sub-region of the input color space, and wherein the target metric value indicates an amount of a colorant to be consumed relative to other colorants to produce the target color;

select, from the set of candidate output color values, a first output color value to correspond to the target color at the first sub-region of the input color space, the first output color value having an associated metric value and an associated colorimetry, wherein the first output color value is selected based on:
  the associated colorimetry of the first output color value and the target colorimetry of the first sub-region of the input color space, and
  the associated metric value of the first output color value and the target metric value of the first sub-region of the input color space; and
generate mapping output data by associating the selected first output color value with the first sub-region of the input color space.

* * * * *